United States Patent
Sterns et al.

(10) Patent No.: US 8,210,757 B2
(45) Date of Patent: Jul. 3, 2012

(54) ADAPTER FOR A CAMERA AND TELESCOPE

(75) Inventors: Michael Sterns, Hall (AT); Christian Steinlechner, Volders (AT)

(73) Assignee: Swarvoski-Optik KG. (AT)

( * ) Notice: Subject to any disclaimer, the term of this patent is extended or adjusted under 35 U.S.C. 154(b) by 0 days.

(21) Appl. No.: 12/635,074

(22) Filed: Dec. 10, 2009

(65) Prior Publication Data

US 2010/0142036 A1 Jun. 10, 2010

(30) Foreign Application Priority Data

Dec. 10, 2008 (AT) .............................. A 1918/2008

(51) Int. Cl.
*G03B 17/00* (2006.01)
(52) U.S. Cl. ....................................... 396/419; 396/428
(58) Field of Classification Search .................. 396/419, 396/422, 428, 429, 432, 502, 504, 544; 359/363, 359/399, 406, 408, 889, 892; 248/176.3, 248/187.1
See application file for complete search history.

(56) References Cited

U.S. PATENT DOCUMENTS

| | | | | |
|---|---|---|---|---|
| 4,794,414 A | * | 12/1988 | Kozina et al. | 396/504 |
| 5,862,428 A | * | 1/1999 | An | 396/544 |
| 6,196,504 B1 | * | 3/2001 | Lemke | 248/187.1 |
| 7,077,582 B2 | * | 7/2006 | Johnson | 396/428 |
| 7,085,491 B2 | * | 8/2006 | Chiang | 396/432 |
| 7,246,956 B2 | | 7/2007 | Pernstich et al. | |
| 2002/0114070 A1 | | 8/2002 | Barziza | |
| 2002/0197075 A1 | | 12/2002 | Crockett | |
| 2006/0165400 A1 | | 7/2006 | Spencer | |

FOREIGN PATENT DOCUMENTS

EP 1477763 A1 11/2004
JP 2006126586 A 5/2006

OTHER PUBLICATIONS

European Search Report, EP09015296, dated Mar. 8, 2010.

* cited by examiner

*Primary Examiner* — W. B. Perkey
*Assistant Examiner* — Minh Phan
(74) *Attorney, Agent, or Firm* — Lerner, David, Littenberg, Krumholz & Mentlik, LLP

(57) ABSTRACT

The invention relates to an adapter (1) for securing a camera (2) or an optical measuring device onto a telescope (3). The adapter (1) comprises a platform (6) for securing the camera (2) and a cylindrical sleeve (4) for securing onto an eyepiece (16) of the telescope (3), wherein the sleeve (4) is attached by flange onto a base plate (5) extending at right angles to a sleeve axis (7). On the base plate (5) a guide is formed, which is formed by two guiding tracks (9, 10) and runs at right angles to the sleeve axis (7), wherein the platform (6) can be adjusted by said guide. On the platform (6) a mechanical stage (23) is also arranged by means of which the camera (2) can be adjusted in a plane running parallel to the sleeve axis (7).

17 Claims, 5 Drawing Sheets

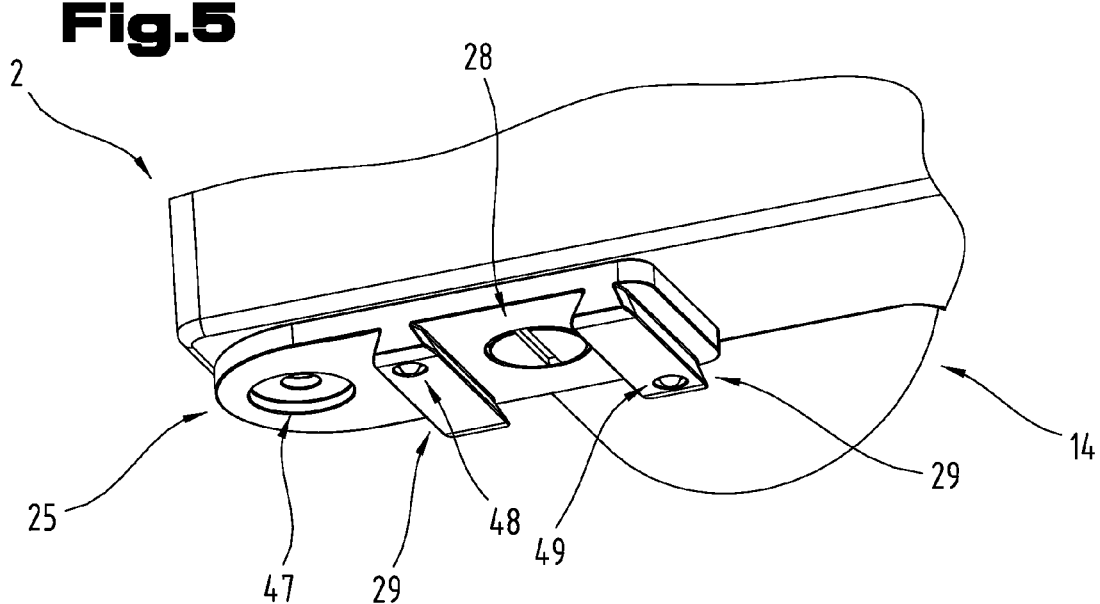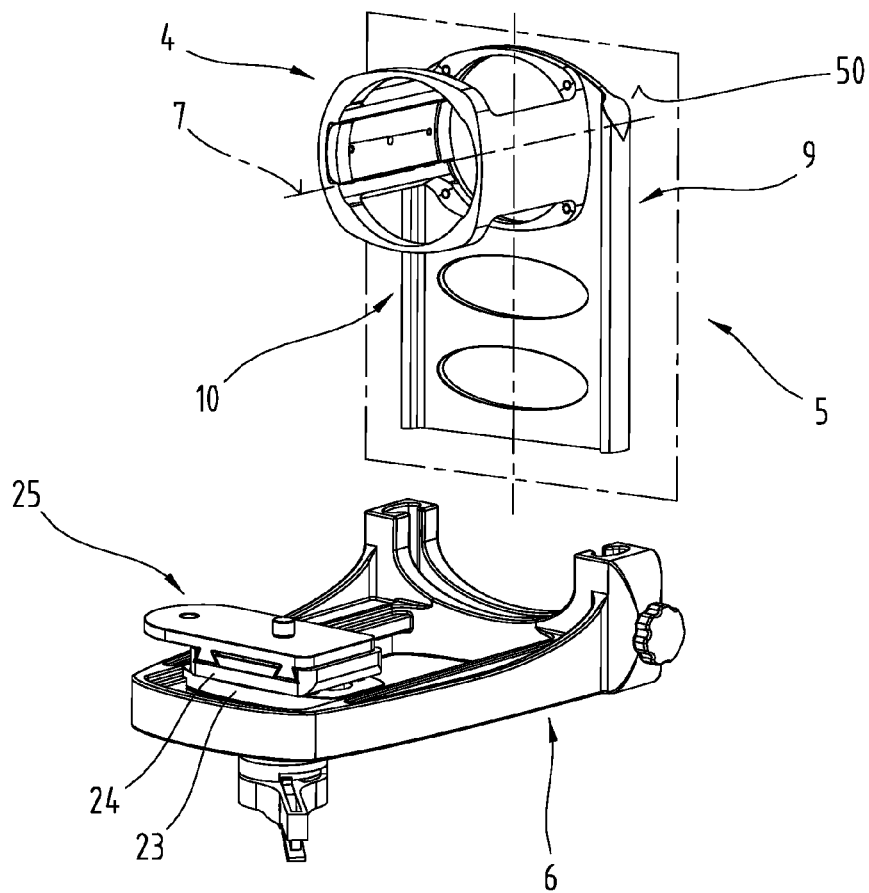

ADAPTER FOR A CAMERA AND TELESCOPE

Applicant claims priority under 35 U.S.C. §119 of AUSTRIAN Patent Application No. A 1918/2008 filed on Dec. 10, 2008.

BACKGROUND OF THE INVENTION

1. Field of the Invention

The invention relates to an adapter and a method for securing an image recording device or an optical measuring device onto an observation telescope according to the features of the preambles of claim 1 and claim 23.

2. Prior Art

Various devices or adapters are already known which make it possible to secure a camera onto an observation telescope and to photograph or film through its eyepiece with the camera. For this firstly the target or the object is viewed through the observation telescope and the image is brought into focus. The adapters used allow the detachable attachment of the camera onto the observation telescope and allow an adjustment between the camera and the observation telescope to align the optical axis of the camera to the optical axis of the observation telescope. In this way observation telescopes can be used for visual observation as well as objectives with a greater focal distance or greater enlargement for conventional photographic devices, digital cameras, camcorders or similar cameras.

In practice the combined use of an observation telescope for both visual observation as well as for photographing or filming with a camera requires the frequent change between visual observation through the eyepiece and fitting on the camera with the adapter. Such an adapter is described for example in EP 1 477 763 A1. With the device disclosed therein the camera is hinged by a pivot arm onto the observation telescope, so that it can be pivoted between a mounting position for photographing or filming and an observation position in which the target can be observed through the telescope eyepiece. In this case the optical axis of the camera objective in the mounting position runs in the direction of the optical axis of the telescope eyepiece, whereas in the observation position the camera is pivoted out of the axis of the telescope eyepiece, whereby the optical axes of the camera objective and the telescope eyepiece enclose an angle. In this way a rapid change between observing on the one hand and photographing or filming on the other hand is possible without influencing the first adjustment between the camera and observation telescope.

Known devices for securing a camera to a telescope mostly have the disadvantage that on detaching the fastening between the telescope and the adapter on the one hand and the camera and the adapter on the other hand the setting is not retained and with the further assembly of the telescope, adapter and camera the adjustment of the optical axes of the camera objective and the telescope eyepiece has to be repeated.

OBJECTIVES AND ADVANTAGES OF THE INVENTION

The objective of the invention is to find a way of securing an image recording device or an optical measuring device onto an observation telescope, which allows rapid and uncomplicated assembly and removal of the image recording device or measuring device, and by means of which the effort of adjusting the optical axes of the objective of the image recording device or measuring device and the telescope eyepiece can be kept to a minimum.

This is achieved according to the invention by means of the device characterised in claim 1.

In this case an adapter for securing an image recording device or an optical measuring device onto an observation telescope is provided with a platform for securing the image recording device or optical measuring device and with a cylindrical sleeve for mounting and securing an eyepiece housing of the observation telescope. In this case the sleeve is joined by a flange onto a base plate extending at right angles to the sleeve axis and on the base plate a guide is formed which consists of two guiding tracks and runs at right angles to the sleeve axis. On the one hand, the platform is adjustable on the guide and on the other hand a mechanical stage is arranged on the platform, by means of which the image recording device or the optical measuring device can be adjustable in a plane that is parallel to the sleeve axis.

The objective of the invention is also achieved independently by the method steps according to claim 23. According to this a method is provided for assembling an image recording device or an optical measuring device onto an observation telescope, in which an adapter with a platform and a cylindrical sleeve are arranged, and wherein the image recording device or the measuring device is secured onto the platform and an eyepiece of the observation telescope is mounted or secured in the sleeve, whereby the sleeve is attached by a flange onto a base plate of the adapter extending at right angles to a sleeve axis and the platform is secured to the base plate. Furthermore, the platform is adjusted on a guide on the base plate, which guide is formed by two guiding tracks and runs at right angles to the sleeve axis, and a mechanical stage, onto which the image recording device or the measuring device are secured, and which is secured onto the platform, is adjusted in a plane that is parallel to the sleeve axis, so that an optical axis of an objective of the image recording device or the optical measuring device are aligned relative to an optical axis of an eyepiece of the observation telescope.

BRIEF DESCRIPTION OF THE DRAWINGS

For a better understanding of the invention the latter is explained in more detail with reference to the following figures.

In a much simplified view:

FIG. 5 shows the camera with the camera shoe mount secured thereon with a view of the lower side of the camera in perspective;

FIG. 6 shows the adapter according to an alternative exemplary embodiment in perspective;

DETAILED DESCRIPTION OF PREFERRED EMBODIMENTS

Figure 1:
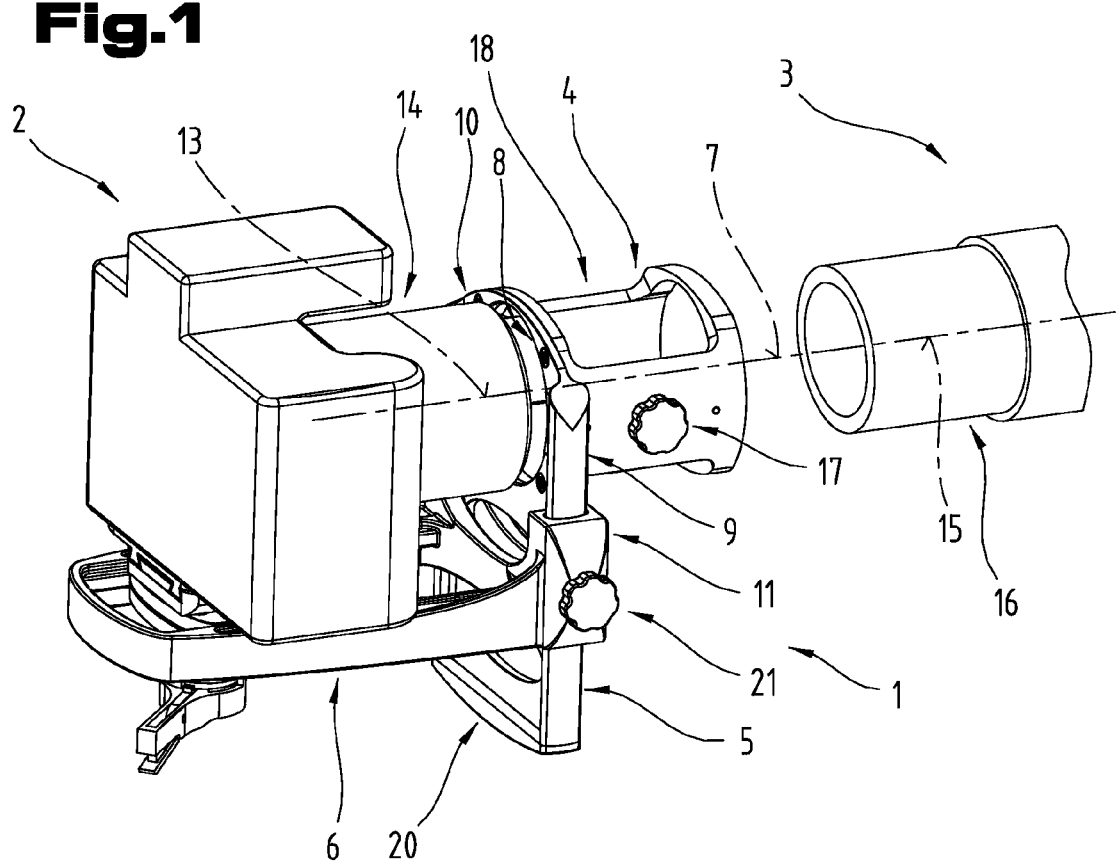
FIG. 1 shows a perspective view of an adapter with a camera and an observation telescope in an assembled state.

First of all, it should be noted that in the variously described exemplary embodiments the same parts have been given the same reference numerals and the same component names, whereby the disclosures made throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

FIG. 1 shows an adapter 1 with a camera 2 secured thereon and an observation telescope 3 in perspective view.

The adapter 1 comprises an essentially cylindrical sleeve 4, which is arranged on a base plate 5, and a platform 6 for securing the camera 2. The base plate 5 is preferably aligned at right angles to a sleeve axis 7, whereby the sleeve 4 is attached by flange onto the latter. In the area of the connection between the sleeve 4 and the base plate 5 the latter has an opening 8 which is coaxial to the sleeve axis 7. The platform 6 for securing the camera 2 is guided adjustably on the base plate 5, so that it can be moved closer to the sleeve axis 7 or removed away from the latter or adjusted in height according to the drawing and can be fixed in different positions. For this between the base plate 5 and the platform 6 a guide is provided which runs through preferably two guiding tracks 9, 10 and at right angles to the sleeve axis 7. As shown in FIG. 1, the guide is preferably a straight guide. As an alternative however a guide formed by curved guiding tracks could also be provided. The guiding tracks 9, 10 at the same time form lateral edges of the base plate 5. The platform 6 or the horizontal stage for securing the camera 2 also comprises sliding members 11, 12 (FIG. 2) corresponding to the profile-like cross section of the guiding tracks 9, 10, which sliding members surround the guiding tracks 9, 10 laterally. This means that an elongated opening is formed in the platform 6, through which the base plate 5 extends, whereby their guiding tracks 9, 10 are guided in the sliding members 11, 12 of the platform 6.

The platform 6 also comprises elements, which make it possible to adjust or displace the camera 2 in a plane that is parallel to the sleeve axis 7. The adapter 1 thus allows an optical axis 13 of an objective 14 of the camera 2 to be aligned as coaxially as possible onto an optical axis 15 of an eyepiece 16 of the observation telescope 3. Lastly, by means of a clamping screw 17 provided in the sleeve 4 the adapter 1 can be fixed onto the eyepiece 14 of the observation telescope 3.

Figure 2:
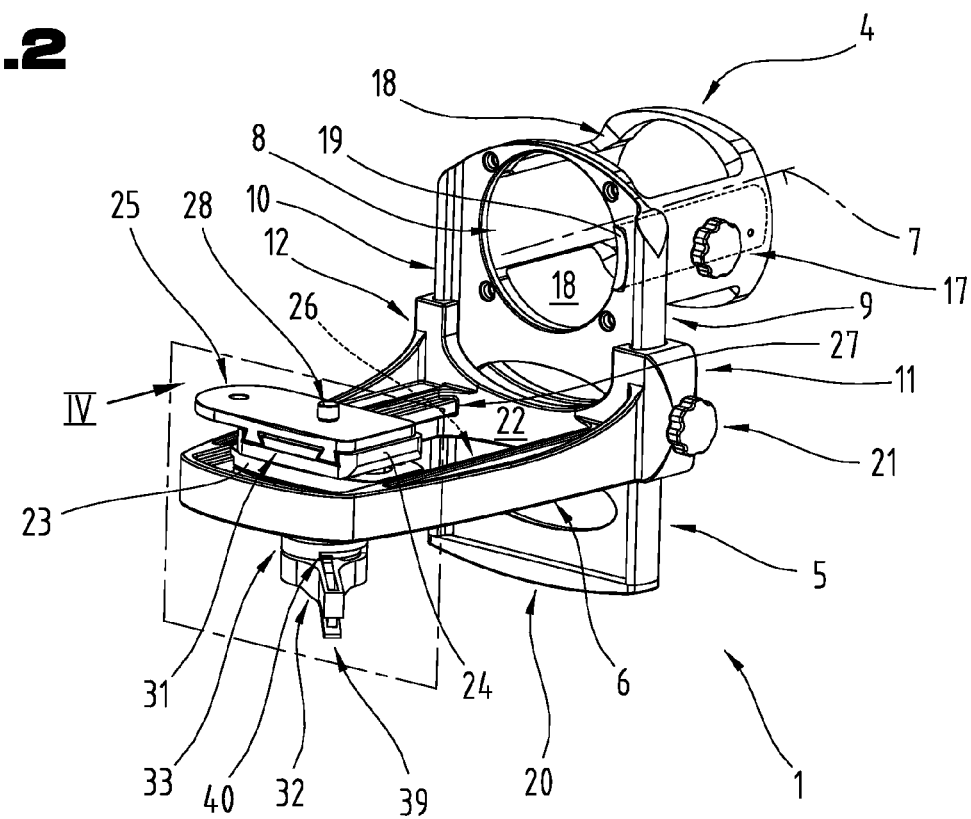
FIG. 2 shows the adapter without the camera.

FIG. 2 shows the adapter 1 without the camera 2.

In the sleeve 4 of the adapter 1 also at least one casing opening 18 is provided, through which manual access and an adjustment of the eyepiece 16 or for example of a zoom ring of the eyepiece 16 are possible. Preferably, two casing openings 18 are provided which lie opposite one another with respect to the sleeve axis 7. The securing of the adapter 1 onto the eyepiece 16 of the observation telescope 3 by means of the clamping screw 17 is performed preferably indirectly by means of a plug 19, which is fitted into a corresponding recess in the casing of the sleeve 4. The plug 19 is designed to be profile-like and extends parallel to the sleeve axis 7, preferably over the entire length of the sleeve 4. By means of the clamping screw 17 the movable plug 19 is moved inwards and pushed against the eyepiece 16.

The base plate 5 forms the middle part connecting the main components of the adapter 1, onto which middle part the sleeve 4 is attached by flange and on the other side the platform 6 for the camera 2 is secured. The platform 6 is adjustable at right angles to the sleeve axis 7 and can be fixed at a variable distance from the sleeve axis 7. The substantially circular opening 8 in base plate 5 is arranged at one of the two end areas of the base plate 7 and between the two lateral edges of base plate 5 forming the guiding tracks 9 and 10. In the end area of the base plate 5 opposite the opening 8, i.e. in the view according to FIG. 2, a closing element 20 is secured to the face side of the base plate 5. Said closing element 20 has a dual function of also being an end stop for the movement range of the sliding members 11, 12 along the guiding tracks 9, 10 of the base plate 5. The external shape of the platform 6 for the camera 2 is designed to be substantially frame-like. To secure the platform 6 onto the base plate 5 in the sliding member 11 of the platform 6 a clamping screw 21 is provided, which preferably with the interconnection of a mobile plug (not shown) acts on the guiding track 9 of the base plate 5. The horizontal stage or the platform 6 forms a closed frame arranged on the two sliding members 11, 12 with a substantially rectangular continuous recess 22. Said recess 22 in the platform 6 forms the mount for a mechanical stage 23 and a clamping unit 24, by means of which a camera shoe mount 25 for securing the camera 2 in a plane parallel to the sleeve axis 7, that is in a direction parallel to the sleeve axis 7, can be adjusted at right angles thereto and fixed. According to the described exemplary embodiment in addition in the recess 22 of the platform 6 two guiding tracks 26, 27 aligned parallel to one another are provided, which together form a straight guide for the mechanical stage 23 aligned parallel to the sleeve axis 7. In an alternative embodiment instead of a straight guide also a guide with curved guiding tracks can be provided. Between the mechanical stage 23 and the clamping unit 24 arranged thereon guiding tracks are provided and the mechanical stage 23 and the clamping unit 24 are in engagement with one another such that a straight guide is formed which is aligned at right angles to the sleeve axis 7.

The adapter 1 thus allows a relative adjustment and/or a relative positioning of the eyepiece 16 of the observation telescope 3 to the objective 14 of the camera 2 in all three possible dimensions. With the adapter 1 these dimensions are achieved by displacing the platform 6 on the guiding tracks 9, 10 of the base plate 5, displacing the mechanical stage 23 on the guiding tracks 26, 27 of the platform 6 and lastly displacing the clamping unit 24 on the mechanical stage 23 in lateral direction. These three adjusting directions are thus at right angles to one another as in a Cartesian coordinate system.

The securing of the camera 2 onto the component group formed by the mechanical stage 23 and the clamping unit 24 is performed by the camera shoe mount 25 which is connected to the camera 2 by a fastening screw 28. In this case the camera shoe mount 25 is detachable from the clamping unit 24 or replaced onto the latter and can be secured onto the clamping unit 24, so that the camera shoe mount 25 can remain fastened to the camera 2. The camera 2 can thus together with the camera shoe mount 25 be separated from the adapter 1 and placed and secured onto the latter, without the adjustment or relative position of the mechanical stage 23 and the clamping unit 24 having to be changed.

The separation from or replacing onto the clamping unit 24 of the camera shoe mount 25 can be seen with reference to the view according to FIG. 2 compared to the view according to FIG. 3, which is described in the following.

Figure 3:
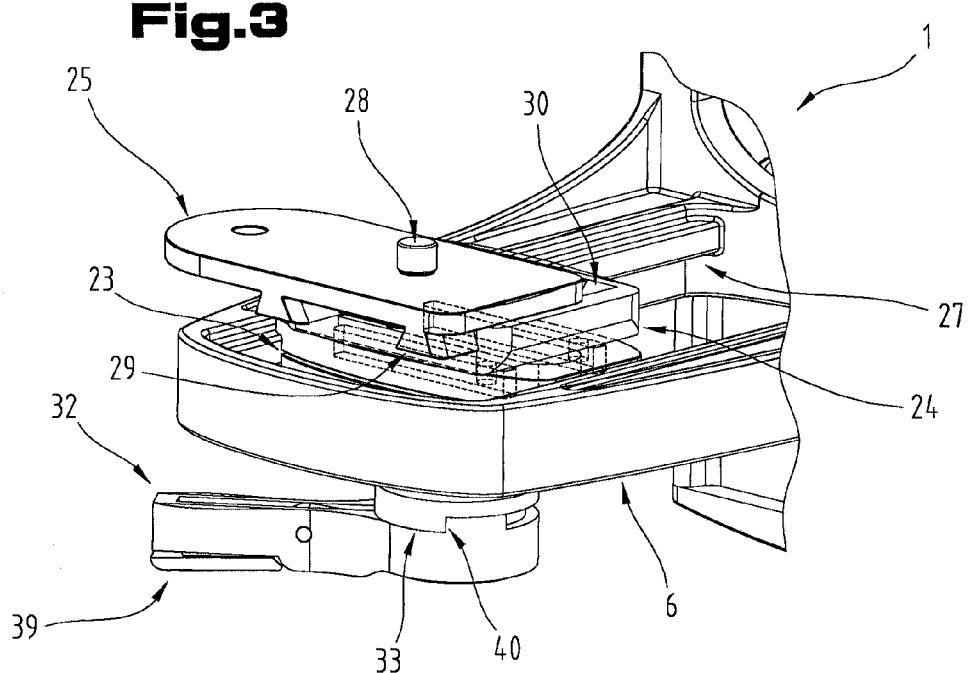
FIG. 3 shows a detail of the adapters according to FIG. 2 without the camera attached.
Figure 4:
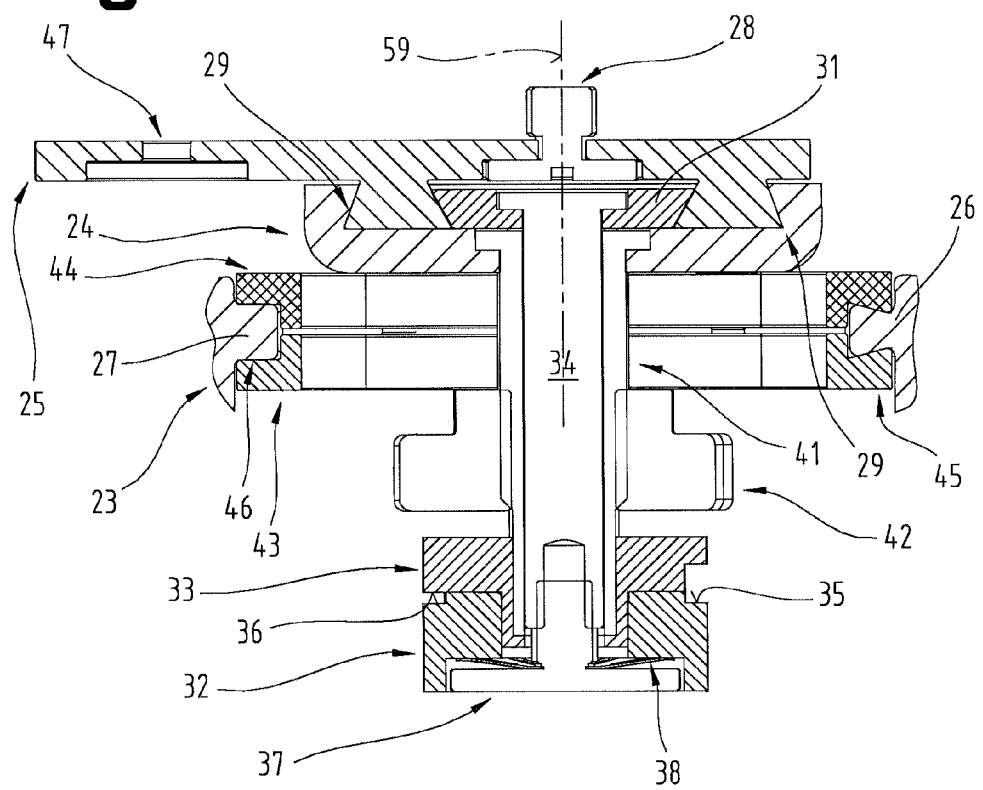
FIG. 4 shows a detail of the adapter according to FIG. 2 in cross section.

FIG. 3 shows a detail of the adapter 1 according to FIG. 2 without a camera 2 secured onto the latter. The camera shoe mount 25 is represented here in a position that is partly detached from the clamping unit 24. To connect the camera shoe mount 25 to the clamping unit 24 a dovetail guide 29 is provided between these two parts. The recess corresponding to the dovetail guide 29 in the clamping unit 24 is closed off by a rear wall 30. The rear wall 30 thus functions as an end stop for the adjustment path of the camera shoe mount 25 along the guide formed by the dovetail guide 29. The securing of the camera shoe mount 25 in the end position bearing on the rear wall 30 (according to the view in FIG. 2) is performed by a prism-like plug 31, by means of which the camera shoe mount 25 is pushed downwards against the clamping unit 24 and thus clamped thereon. The activation of the plug 31 for clamping the camera shoe mount 25 is performed by pivoting a lever 32 from the "open" position (FIG. 3) into the "closed" position (FIG. 2), whereby the plug 31 is pulled downwards. This functioning is illustrated by FIG. 4 described in the following. The hub of the lever 32 is thus supported in axial direction against a fixed threaded sleeve 33.

FIG. 4 shows a detail of the adapter 1 according to FIG. 2 in cross section. The lever 32 is connected to the plug 31 for fixing the camera shoe mount 25 by a mandrel 34. Between the immediately opposite sides 35, 36 of the hub of the lever 32 on the one hand and the threaded sleeve 33 on the other hand oblique ramps are arranged, which slide onto one another during the pivoting of the lever 32. In this way when pivoting the lever 32 between the "open" and "closed" positions there is an axial displacement of the plug 31, the mandrel 34 and the lever 32 relative to the threaded sleeve 33. In this case the hub of the lever 32 is secured by a screw 37 onto the mandrel 34, whereby between the screw 37 and the lever 32 a spring 38 is arranged, so that when clamping the plug 31 to clamp the camera shoe mount 25 a predefined force can be achieved. Also in the lever 32 a pivotable bar 39 (FIG. 2) is integrated, which can be brought into engagement with the stop 40 of the threaded sleeve 33, so that the lever 32 is secured in the "closed" position. Only by unlocking the bar 39 can the lever be pivoted into the "open" position and thus the clamping of the camera shoe mount 25 with the clamping unit 24 released.

The threaded sleeve 33 is secured onto a clamping bolt 41, through which the mandrel 34 extends. At one end the clamping bolt 41 is connected to the clamping unit 24, whereby between the latter and a knurled nut 43 screwed onto the clamping bolt 41 the mechanical stage 23 is secured. The mechanical stage 23 comprises according to this exemplary embodiment a first mechanical stage plate 43 and a second mechanical stage plate 44, which are arranged like a sandwich on top of one another. In the lateral end areas of the preferably symmetrical mechanical stage plates 43, 44 mechanical stage guides 45, 46 are provided, the cross sections of which are designed to be complementary to the cross sections of the guiding tracks 26, 27 of the platform 6. In this case the cross section of the first guiding track 26 and the complementary cross section of the first mechanical stage guide 45 are in the shape of a trapezium. This allows an automatic alignment of the mechanical stage 23 parallel to the first guiding track 26 and thus parallel to the sleeve axis 7. Unlike the first mechanical stage guide 45 the second mechanical stage guide 46 and the complementary guiding track 27 of the platform 6 have a rectangular cross section. The guiding track 27 and the mechanical stage guide 46 thus have two degrees of freedom relative to one another, whereas the guiding track 26 and the mechanical stage guide 45 due to the trapezium shape have only one degree of freedom. This allows a reliable and precise alignment of the mechanical stage 26 relative to the platform 6.

By adjusting the knurled nuts 42 along the clamping bolt 41 the mechanical stage plates 43, 44 can be moved towards one another and thus the mechanical stage 23 can be clamped onto the guiding tracks 26, 27 of the platform 6. At the same time the clamping unit 24 is also pushed against the mechanical stage 23. In this way a further displacement of the mechanical stage 23 along the guiding tracks 26, 27 as well as a lateral displacement of the clamping unit 24 with the camera shoe mount 25 is blocked at right angles to the direction of the guiding tracks 26, 27.

According to the methods of fixing achievable by means of the lever 32 and the knurled nuts 42 in the adapter 1 two independently operating clamping devices are formed. When the lever 32 is in the "open" position the camera shoe mount 25 can be displaced along the dovetail guide 29 in the clamping unit 24 and removed from the latter. Regardless of this a clamping device is formed which acts on the platform 6, the mechanical stage 23 and the clamping unit 24. If the knurled screw 42 is loosened, the mechanical stage 23 in the platform 6 can be pushed forwards or backwards, and also the clamping unit 24 can be displaced in lateral direction relative to the mechanical stage 23. The thus independently operating clamping devices have the advantage that when removing the camera shoe mount 25 from the clamping unit 24 the settings of the mechanical stage 23 relative to the platform 6 remain saved.

FIG. 5 shows the camera 2 with the camera shoe mount 25 secured thereonto in a view of the underside of the camera 2 in perspective. The camera shoe mount 25 is secured by the fastening screw 28 onto the camera 2, in that the fastening screw 28 is screwed to the support thread (not shown) of the camera 2. Next to the position of the fastening screw 28 shown in FIG. 5 preferably a second hole 47 is provided for the latter in the camera shoe mount 25, so that the screw connection can be achieved with the fastening screw 28 for different models of the camera 2 at different points of the camera shoe mount 25.

In addition, the dovetail guide 29 of the camera shoe mount 25 is designed to be mirror-symmetrical relative to a middle plane 59. This means that a cross section of the dovetail guide 29 relative to a cross sectional plane perpendicular to the longitudinal extension of the dovetail guide 29 (FIG. 4) is minor-symmetrical to the middle plane 59. In this way it is possible that the camera shoe mount 25 can be inserted in the position shown in FIG. 4 as well as in a position rotated 180° relative to the latter into the clamping unit 24 and can be fixed onto the latter. As well as the position of the through hole 47 (FIG. 4) projecting to the left the latter can thus also be arranged in a position projecting to the right. For the fastening screw 28 for securing to the support thread of the camera 2 thus a total of 3 different positions are available, which provide much greater flexibility or dimensional range with respect to the options for securing different models of cameras 2 or optical measuring devices.

The camera shoe mount 25 also comprises locking mechanisms 48, 49 pretensioned by springs (not shown) in the underside of the dovetail guide 29. The locking mechanisms 48, 49 preferably comprise metal balls pretensioned by springs, which in the position fitted onto the clamping unit 24 (FIG. 2), press into corresponding depressions in the clamping unit 24. The locking mechanisms 48, 49 thus prevent in the opened state, that is when the lever 32 is in the "open" position (FIG. 3), the camera shoe mount 25 together with the camera 2 from sliding out of the dovetail guide 29 and thus prevent the camera 2 from falling to the ground. For the user of the adapter 1 it is an additional advantage that when fitting the camera shoe mount 25 with the camera 2 onto the clamping unit 24 a noise indicates that the end position has been reached, which is caused by the balls of the locking mechanisms 48, 49 snapping into place.

FIG. 6 shows the adapter 1 according to an alternative exemplary embodiment in perspective view. The base plate 5 with the sleeve 4 on the one hand and the platform 6 for the camera 2 are shown in a separated position. The base plate 5 and the sleeve 4 are located in a position pivoted by 180° relative to the position according to FIGS. 1 and 2. According to this exemplary embodiment the sleeve 4 faces the camera shoe mount 25 secured to the clamping unit 24 or the mechanical stage 23. In the assembled state a distance reduced by about the length of the sleeve 4 of an eyepiece 16 pushed into the sleeve 4 is formed relative to the camera shoe mount 25 or a camera secured thereonto. The two guiding tracks 9, 10 of the base plate 5 are preferably designed to have an identically formed cross section. After removing the closing element 20 from the base plate 5 the latter can be separated from the platform 6 or its sliding members 11, 12 from the platform 6 and optionally reconnected in one of the two positions of the sleeve 4 shown in FIGS. 2 and 6 to the platform 6. The base plate 5 is preferably designed to be symmetrical to a middle plane 50 perpendicular to the sleeve axis 7.

In an alternative embodiment of the adapter 1 the connection of the sleeve 4 to the base plate 5 is released and thus removed from the side of the base plate 5 facing away from the camera 2 (FIG. 1) and is refastened on the side of the base plate 5 facing the camera 2 (FIG. 6).

Figure 7:
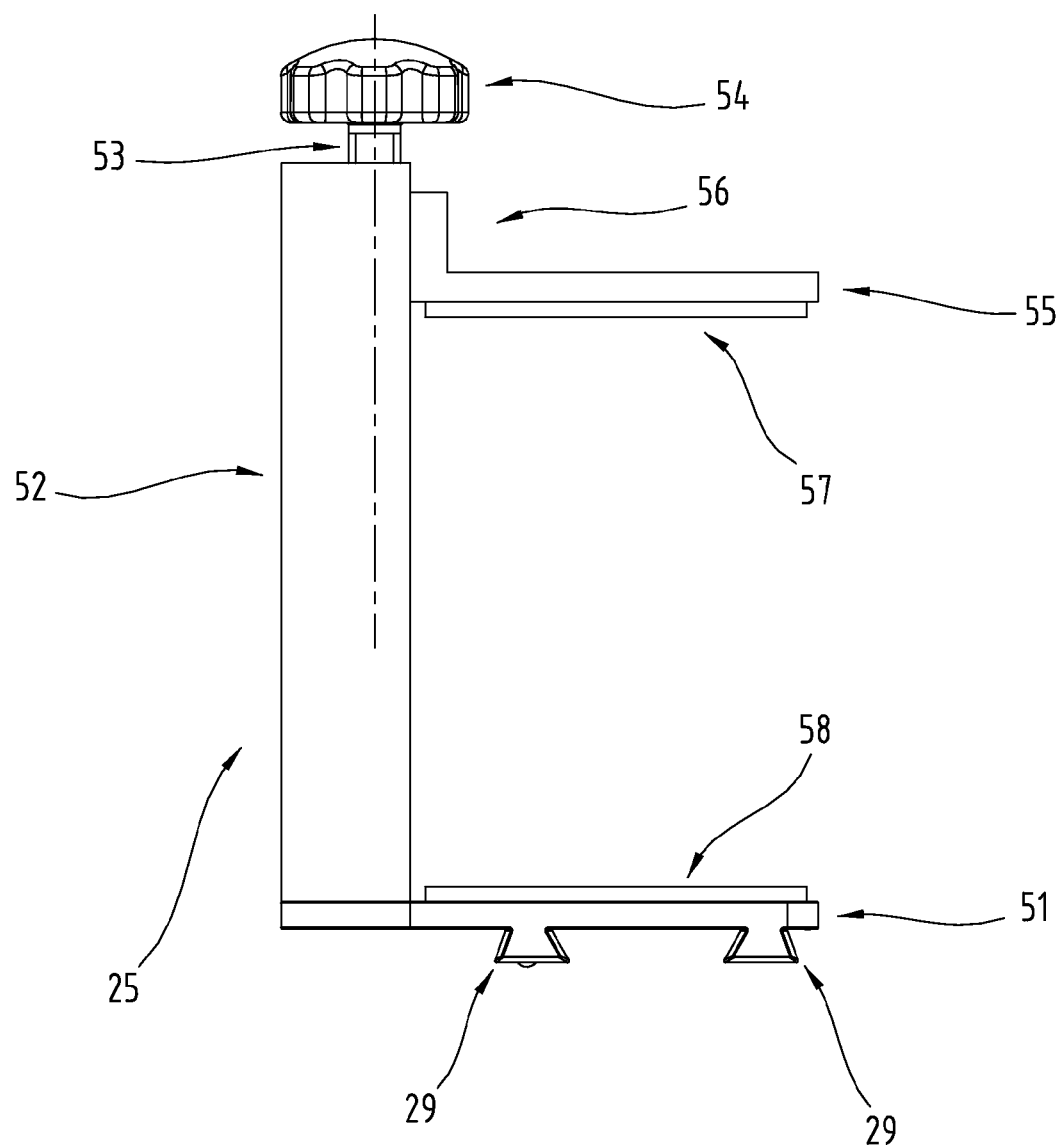
FIG. 7 shows an alternative exemplary embodiment of a camera shoe mount for the adapter.

FIG. 7 shows an alternative exemplary embodiment of a camera shoe mount 25 for the adapter 1. Said camera shoe mount 25 comprises a plate-like basic body 51 with the dovetail guide 29 for securing onto the clamping unit 24 (FIG. 2, 3). In a lateral end section of the basic body 51a gear housing 52 sitting on the latter is securely connected to the basic body 51. In the gear housing 52 there is a threaded spindle 53 aligned at right angles to the plate-like basic body 51, which spindle can be rotated with a spindle head 54. The camera shoe 25 according to this exemplary embodiment also comprises a plate-like clamping jaw 55 arranged parallel to the plate-like basic body 51. The clamping jaw 55 is connected to a sliding member 56 and is thus guided adjustable projecting laterally from the gear housing 52 in vertical direction. For this the sliding member 56 comprises a threaded hole (not shown), which is in engagement with the threaded spindle 53. On the facing sides of the basic body 51 and the clamping jaw 55 clamping cushions 57, 58 are attached. Between the rubber elastic and the non-slip clamping cushion 57, 58 of the camera shoe 25 according to this exemplary embodiment the housing of a camera 2 can be clamped and fixed into position. The camera shoe mount 25 according to this embodiment is used together with cameras which according to their form have no stative thread and thus are not secured onto the fastening screw 28 (FIG. 1, 2). This includes for example many of the digital cameras with very small external dimensions but also for example mobile phones with integrated digital cameras.

Figure 8:
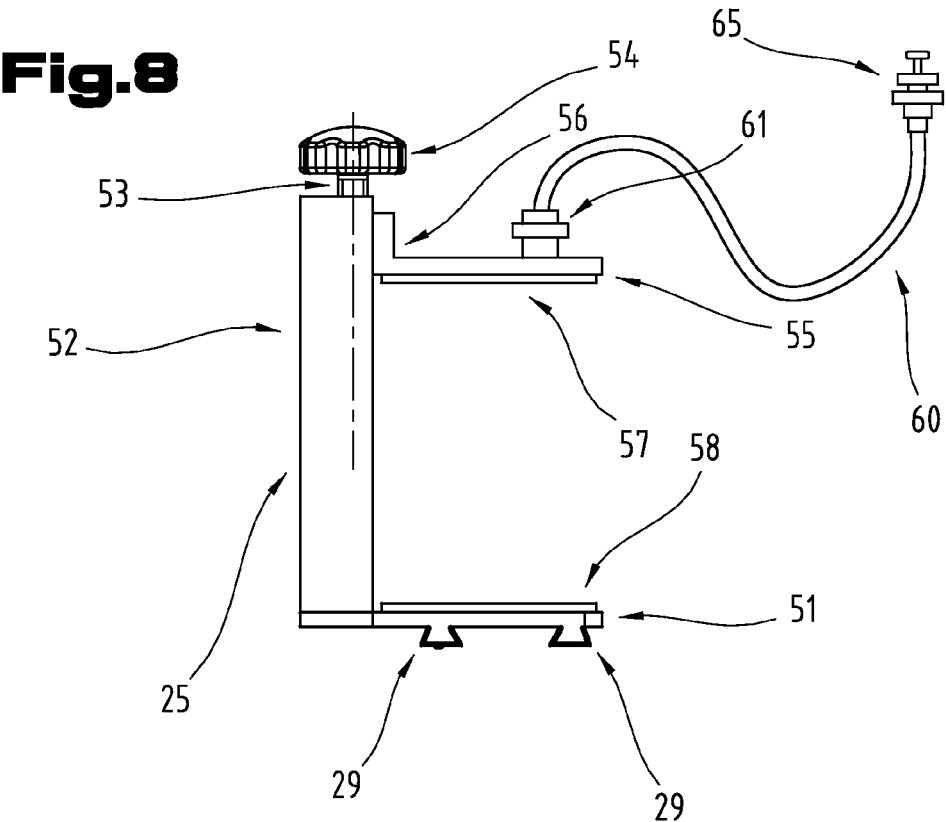
FIG. 8 shows a modified variant of the adapter according to FIG. 7 with an integrated remote control.

FIG. 8 shows a modified variant of the adapter 1 according to FIG. 7 with an integrated remote control 60. The latter is secured with its camera-side end to a plug housing 61 onto the clamping jaw 55 of the adapter 1.

Figure 9:
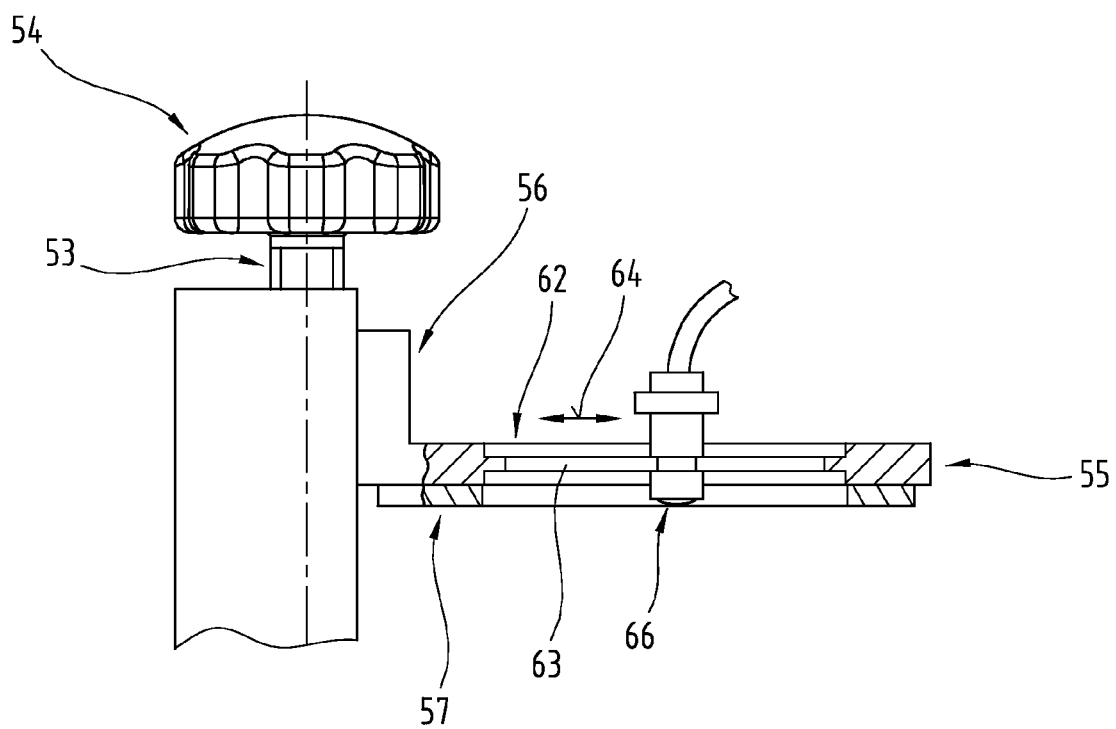
FIG. 9 shows a detail of the adapter according to FIG. 8 in a partial cross section.

FIG. 9 shows a detail of the adapter 1 according to FIG. 8 in partial cross section. To secure the plug housing 61 and thus the cable trigger 60 on the clamping jaw 55 an elongated hole 62 is provided in the latter. On its inside the elongated hole 62 comprises a guide 63, on which the plug housing 61 can be displaced in lateral direction—according to double arrow 64—and fixed in different positions. By activating a trigger button 65 of the remote control 60 a plug 66 from the plug housing 61 can be moved downwards and thus the camera release 2 can be pressed. By adjusting the plug housing 61 in this way in the clamping jaw 55 the required alignment of the plug on the release of the camera 2 can also be achieved for differently designed cameras.

According to the exemplary embodiment shown in FIGS. 8 and 9 the remote control 60 is formed by a cable trigger. Alternatively, electrically or pneumatically operated remote controls can be provided.

A particular advantage of the adapter 1 according to the invention is the great flexibility in changing between different uses of the camera 2 on the one hand and also of the observation telescope on the other hand. After removing the camera together with the adapter by releasing the connection of the sleeve 4 with the eyepiece 16 for visual observation through the observation telescope 3 as well as after removing the camera 2 from the adapter 1, whereby the camera shoe mount 25 remains secured onto the camera 2, the original adjustment of the optical axes 13, 15 of the camera objective 14 and the eyepiece 16 of the observation telescope can be rapidly returned to. The positions or settings of the platform 6 relative to the base plate 5 as well as the mechanical stage 23 relative to the platform 6 remain saved. This is because as in the known disassembly and assembly of the fastenings between the base plate 5 and the platform 6 also between the platform 6 and the mechanical stage 23 or the clamping unit 24 there is no change in the adjustment settings.

According to an advantageous development of the adapter 1 in the region of one of the guiding tracks 9, 10 and also in the region between one of the guiding tracks 26, 27 and the mechanical stage 23 and the adjacent area between the mechanical stage 23 and the clamping unit 24 scales (not shown) are provided. With the frequent use of the same camera 2 with the adapter 1 if there is an adjustment of the settings, for example when using a different camera 2, the original setting can be found again quickly and easily 2. According to another advantageous development of the adapter 1 according to the invention helical gears (not shown) operating between the base plate 5 and the platform 6, between the platform 6 and the mechanical stage 23 and also between the mechanical stage 23 and the clamping unit 24 are provided, by means of which the adjustment can also be performed very precisely even with small adjustment movements along the guiding tacks.

The exemplary embodiments show possible embodiment variants of the adapter 1, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field. Thus all conceivable embodiment variants, which are made possible by combining individual details of the embodiment variants shown and described, are also covered by the scope of protection.

Finally, as a point of formality, it should be noted that for a better understanding of the structure of the adapter 1, the latter and its components have not been represented true to scale in part and/or have been enlarged and/or reduced in size. The problem forming the basis of the independent solutions according to the invention can be taken from the description.

Mainly the individual embodiments shown in FIGS. 1 to 5; 6; 7 and 8, 9 can form the subject matter of independent solutions according to the invention. The objectives and solutions according to the invention relating thereto can be taken from the detailed descriptions of these figures.

List of reference numbers

| | |
|---|---|
| 1. | Adapter |
| 2. | Camera |
| 3. | Observation telescope |
| 4. | Sleeve |
| 5. | Base plate |
| 6. | Platform |
| 7. | Sleeve axis |
| 8. | Opening |
| 9. | Guiding track |
| 10. | Guiding track |
| 11. | Sliding member |
| 12. | Sliding member |
| 13. | Optical axis |
| 14. | Objective |
| 15. | Optical axis |
| 16. | Eyepiece |
| 17. | Clamping screw |
| 18. | Casing opening |
| 19. | Plug |
| 20. | Closing element |
| 21. | Clamping screw |
| 22. | Recess |
| 23. | Mechanical stage |
| 24. | Clamping unit |
| 25. | Camera shoe mount |
| 26. | Guiding track |
| 27. | Guiding track |
| 28. | Fastening screw |
| 29. | Dovetail guide |
| 30. | Rear wall |
| 31. | Plug |
| 32. | Lever |
| 33. | Threaded sleeve |
| 34. | Mandrel |
| 35. | Side |
| 36. | Side |
| 37. | Screw |
| 38. | Spring |
| 39. | Bar |
| 40. | Stop |
| 41. | Clamping bolt |
| 42. | Knurled nut |
| 43. | Mechanical stage plate |
| 44. | Mechanical stage plate |
| 45. | Mechanical stage guide |
| 46. | Mechanical stage guide |
| 47. | Through hole |
| 48. | Locking mechanism |
| 49. | Locking mechanism |
| 50. | Middle plane |
| 51. | Basic body |
| 52. | Gear housing |
| 53. | Threaded spindle |
| 54. | Spindle head |
| 55. | Clamping jaw |
| 56. | Sliding member |
| 57. | Clamping cushion |
| 58. | Clamping cushion |
| 59. | Middle plane of the dovetail guide |
| 60. | Remote control |
| 61. | Plug housing |
| 62. | Elongated hole |
| 63. | Guide |
| 64. | Double arrow |
| 65. | Trigger button |
| 66. | Plug |

What is claimed is:

1. An adapter for securing an image recording device or an optical measuring device onto an observation telescope, comprising:

a cylindrical sleeve for securing onto an eyepiece housing of the observation telescope, the sleeve defining a longitudinal sleeve axis;

a base plate extending at right angles to the sleeve axis, the sleeve being attached to the base plate, the base plate including a first guide formed by two guiding tracks running at right angles to the sleeve axis;

a platform for securing the image recording device or the measuring device, the platform being adjustable along the first guide of the base plate;

a mechanical stage arranged on the platform, the mechanical stage being configured to adjust a position of the image recording device or the measuring device along a first dimension and a second dimension with respect to the platform, such that the image recording device or the measuring device is positionable at any location within a plane parallel to the sleeve axis; and a second guide between the platform and the mechanical stage, the second guide being aligned parallel to the sleeve axis, the second guide including two parallel aligned guiding tracks on the platform and two mechanical stage guides on the mechanical stage, the mechanical stage guides being in engagement with the guiding tracks of the platform.

2. The adapter according to claim 1, further including a clamping unit on the mechanical stage, wherein the clamping unit is adjustable at right angles to the sleeve axis and at right angles to the first guide.

3. The adapter according to claim 2, further comprising a third guide between the mechanical stage and the clamping unit, the third guide being aligned at right angles to the sleeve axis and at right angles to the first guide.

4. The adapter according to claim 2, wherein a camera shoe mount is connected to the clamping unit for directly securing to a camera.

5. The adapter according to claim 4, wherein the camera shoe mount and the clamping unit comprise a first clamping device configured to securely clamp the camera shoe mount onto the clamping unit, wherein said first clamping device can be released or fixed independently of a second clamping device, the second clamping device being configured to fix the mechanical stage, the clamping unit and the platform relative to one another.

6. The adapter according to claim 2, wherein a helical gear for changing relative positions is provided between the base plate and the platform or between the platform and the mechanical stage or between the mechanical stage and the clamping unit.

7. The adapter according to claim 1, wherein the platform includes a substantially rectangular, continuous recess, the guiding tracks of the platform being located in the recess of the platform.

8. The adapter according to claim 1, wherein the mechanical stage comprises a first mechanical stage plate and a second mechanical stage plate arranged on top of one another, the first and second mechanical stage plates having lateral ends defining the mechanical stage guides, the mechanical stage guides being complementary to the guiding tracks of the platform.

9. The adapter according to claim 8, further including a clamping unit on the mechanical stage, wherein the mechanical stage and the clamping unit comprise a clamping device, the clamping device being configured to securely clamp the clamping unit to the mechanical stage, and the clamping device being configured to press the first and second mechanical stage plates against one another so as to securely clamp the mechanical stage guides onto the guiding tracks of the platform.

10. The adapter according to claim 1, wherein a cross section of a first one of the guiding tracks of the platform and a cross section of a first one of the mechanical stage guides define complementary trapezoidal shapes, so that relative movement between the first guiding track and the first mechanical stage guide has only one degree of freedom.

11. The adapter according to claim 1, wherein the two guiding tracks of the base plate have identically shaped cross sections.

12. The adapter according to claim 1, wherein the base plate is shaped to be symmetrical to a middle plane that is perpendicular to the sleeve axis.

13. The adapter according to claim 1, further including a clamping unit on the mechanical stage, wherein a scale for determining relative positions is provided proximate one of the guiding tracks of the first guide or is provided between one of the guiding tracks of the second guide and the mechanical stage or is provided between the mechanical stage and the clamping unit.

14. A method for assembling an image recording device or an optical measuring device onto an observation telescope, comprising:
   securing the image recording device or the measuring device onto a platform of an adapter, the adapter comprising a cylindrical sleeve defining a longitudinal sleeve axis, the sleeve being attached to a base plate extending at right angles to the sleeve axis, the platform being secured onto the base plate;
   securing or mounting an eyepiece of the observation telescope in the sleeve;
   adjusting the platform along a first guide on the base plate; and
   operating a mechanical stage so as to adjust a position of the image recording device or the measuring device along a first dimension and a second dimension with respect to the platform, the image recording device or the measuring device being positionable by the mechanical stage at any location within a plane parallel to the sleeve axis, the image recording device or the measuring device being secured to the mechanical stage, and the mechanical stage being secured onto the platform along a second guide between the platform and the mechanical stage, the second guide being aligned parallel to the sleeve axis, the second guide including two parallel aligned guiding tracks on the platform and two mechanical stage guides on the mechanical stage, the mechanical stage guides being in engagement with the guiding tracks of the platform.

15. The method according to claim 14, further comprising removing a camera shoe mount carrying the image recording device or the optical measuring device from a clamping unit arranged on the platform in a first orientation, and then rotating the camera shoe mount 180° relative to the clamping unit into a second orientation, and then reinserting the camera shoe mount into the clamping unit and fixing the camera shoe mount in the clamping unit in the second orientation.

16. The method according to claim 14, further comprising removing a camera shoe mount supporting the image recording device or the optical measuring device from a clamping unit on the mechanical stage, while an attachment between the clamping unit, the mechanical stage and the platform remains fixed, thereby saving the relative positions between the clamping unit, the mechanical stage and the platform.

17. A method for assembling an image recording device or an optical measuring device onto an observation telescope, comprising:
   securing the image recording device or the measuring device onto a platform of an adapter, the adapter comprising a cylindrical sleeve defining a longitudinal sleeve axis, the sleeve being attached to a base plate extending at right angles to the sleeve axis, the platform being secured onto the base plate, the sleeve being attached to one face of the base plate and the sleeve projecting laterally from the base plate in a first orientation;
   securing or mounting an eyepiece of the observation telescope in the sleeve;
   adjusting the platform along a first guide on the base plate; and
   removing the base plate from the platform with the sleeve in the first orientation, and then rotating the base plate with the sleeve 180° relative to the platform into a second orientation in which the sleeve is oriented opposite to the first orientation, and then reinserting the base plate into the platform and securing the base plate to the platform in the second orientation, before the step of securing the image recording device or the optical measuring device onto the platform of the adapter and before the step of securing or mounting the eyepiece of the observation telescope in the sleeve of the adapter.

* * * * *

UNITED STATES PATENT AND TRADEMARK OFFICE
CERTIFICATE OF CORRECTION

PATENT NO. : 8,210,757 B2  
APPLICATION NO. : 12/635074  
DATED : July 3, 2012  
INVENTOR(S) : Michael Sterns and Christian Steinlechner Page 1 of 1

It is certified that error appears in the above-identified patent and that said Letters Patent is hereby corrected as shown below:

Title Page Item (73) Assignee name "Swarvoski" should read --Swarovski--

Signed and Sealed this  
Twenty-third Day of September, 2014

Michelle K. Lee  
*Deputy Director of the United States Patent and Trademark Office*